(12) United States Patent
McLean

(10) Patent No.: US 6,593,022 B1
(45) Date of Patent: Jul. 15, 2003

(54) MEMBRANE ELECTRODE ASSEMBLY PROVIDING INTERCONNECTION OF REACTANT GAS FLOWPATHS IN UNDULATE LAYER FUEL CELL STACKS

(75) Inventor: Gerard Francis McLean, Victoria (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/720,462

(22) PCT Filed: Jul. 1, 1999

(86) PCT No.: PCT/GB99/02066

§ 371 (c)(1),
(2), (4) Date: Feb. 27, 2001

(87) PCT Pub. No.: WO00/02268

PCT Pub. Date: Jan. 13, 2000

(30) Foreign Application Priority Data

Jul. 1, 1998 (GB) .............................................. 9814121

(51) Int. Cl.[7] .............................................. H01M 8/10
(52) U.S. Cl. ............................ 429/38; 429/30; 429/34
(58) Field of Search ............................. 429/34, 38, 30, 429/39, 32

(56) References Cited

U.S. PATENT DOCUMENTS

| 3,589,942 | A | | 6/1971 | Leitz, Jr. et al. ............... 136/86 |
|---|---|---|---|---|
| 4,444,851 | A | | 4/1984 | Maru ........................... 429/26 |
| 4,988,583 | A | | 1/1991 | Watkins et al. ................ 429/30 |
| 5,108,849 | A | | 4/1992 | Watkins et al. ................ 429/30 |
| 5,145,754 | A | * | 9/1992 | Misawa et al. ................ 429/32 |
| 5,213,910 | A | * | 5/1993 | Yamada ........................ 429/32 |
| 5,300,370 | A | | 4/1994 | Washington et al. .......... 429/34 |
| 5,514,487 | A | | 5/1996 | Washington et al. .......... 429/39 |
| 5,824,428 | A | * | 10/1998 | Nishida et al. ................ 429/26 |
| 5,858,567 | A | | 1/1999 | Spear, Jr. et al. ............. 429/12 |
| 6,296,963 | B1 | * | 10/2001 | Nanjo .......................... 429/38 |
| 6,316,138 | B1 | * | 11/2001 | Satake et al. ................. 429/36 |

FOREIGN PATENT DOCUMENTS

| DE | 25 14 034 | 9/1976 |
|---|---|---|
| DE | 38 12 813 | 6/1989 |
| GB | 2 158 989 | 11/1985 |
| GB | 9814123.7 | 7/1998 |
| JP | 3-238762 | * 10/1991 |
| JP | 5-29006 | 2/1993 |
| JP | 8-50903 | 2/1996 |
| WO | WO 96/12316 | 4/1996 |

* cited by examiner

Primary Examiner—Patrick Ryan
Assistant Examiner—Tracy Dove
(74) Attorney, Agent, or Firm—McAndrews, Held & Malloy, Ltd.

(57) ABSTRACT

An improved structure for a proton exchange membrane fuel cell stack is disclosed. The proton exchange membrane fuel cell stack comprising a membrane electrode assembly layer having a first surface and a second surface wherein a fuel gas flow field comprising at least one fuel gas flowpath is adjacent the first surface and an oxidant gas flow field comprising at least one oxidant gas flowpath is adjacent the second surface, the flowpaths having parallel transversely spaced and longitudinally extending flow channels interconnected in the vicinity of the ends of the flow channels to form the flowpaths. The membrane electrode assembly layer being provided, on both the first and second surfaces, with an array of spaced flow channel couplings, each coupling interconnecting at least two adjacent flow channels on the same surface of the assembly to form flowpaths for each of a fuel gas and an oxidant gas on respective surfaces of the assembly, wherein the couplings for the oxidant gas flow channels are transversely offset from the couplings for the fuel gas flow channels and wherein the membrane electrode assembly layer is undulate.

11 Claims, 4 Drawing Sheets

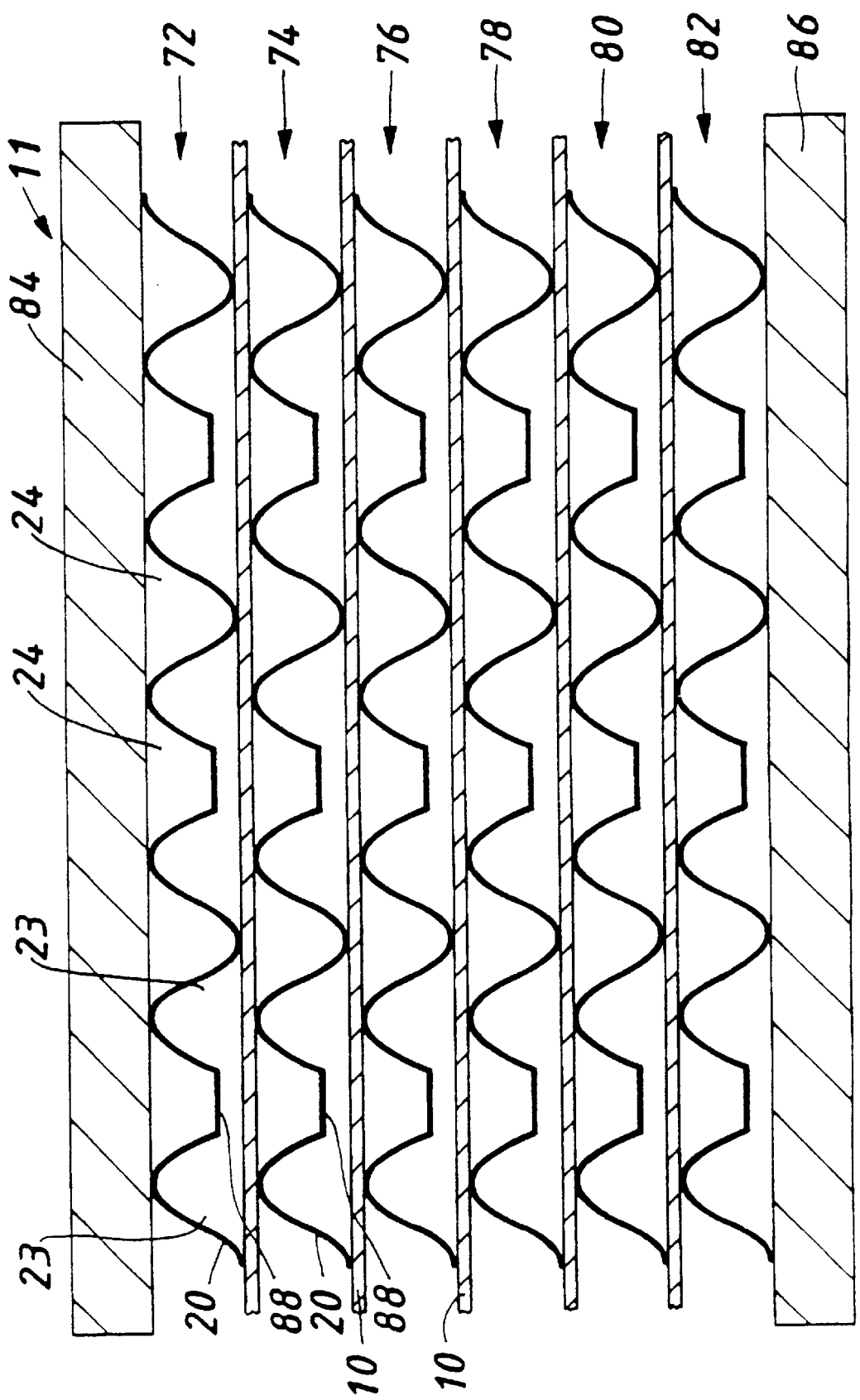

MEMBRANE ELECTRODE ASSEMBLY PROVIDING INTERCONNECTION OF REACTANT GAS FLOWPATHS IN UNDULATE LAYER FUEL CELL STACKS

RELATED APPLICATION

This application includes subject-matter incorporated from applicant's British Patent Application Ser. No. 9814121.1 filed on Jul. 1, 1998.

FIELD OF THE INVENTION

The invention relates to a stratum such as a separator plate for use as a subcomponent of a fuel cell stack, and especially a PEM-type fuel cell stack ("PEM" is an acronym for "proton exchange membrane"), and to preferred methods of use of such strata in a fuel cell stack.

BACKGROUND

Electrochemical fuel cells convert fuel and oxidant to electricity and reaction product. In electrochemical fuel cells employing hydrogen as the fuel and oxygen as the oxidant, the reaction product is water. Solid polymer fuel cells generally include a membrane electrode assembly, ("MEA") comprising a solid polymer electrolyte or ion exchange membrane disposed between two electrode layers. The electrode layers typically comprise porous, electrically conductive sheet material and an electrocatalyst at each membrane-electrode interface to promote the desired electrochemical reactions.

At the fuel cell anode, the fuel (typically hydrogen) moves through the porous electrode material and is oxidized at the anode electrocatalyst to form cations, which migrate through the membrane to the cathode. At the cathode, the oxidizing gas (typically air containing oxygen) moves through the porous electrode material and is reduced at the cathode electrocatalyst to form a reaction product, usually water. The anode and cathode also respectively donate and accept the electrons required for the electric current flow from and to the fuel cell and ultimately through the load across which the fuel cell alone or in electrical combination with other fuel cells (usually a series connection in a stack) is connected. More specifically, in the vicinity of the anode of each fuel cell in the stack, the hydrogen breaks down into (i) the positively charged protons that move through the polymeric membrane, and (ii) electrons that flow to the next fuel cell connected in series in the stack (or, if the fuel cell is a terminating fuel cell in a stack, through the load across which the fuel cell stack end terminals are connected). In the vicinity of the cathode, not only do the fuel and oxidant gases complete the exothermic chemical reaction that provides the water or other reaction product, but the electric circuit is also completed; the electrons that flow through the load combine with the cations and the oxidant to form an electrically neutral reaction product, usually water. The hydrogen may be supplied directly from a supply of same or may be a conversion product of, for example, a hydrocarbon such as methane.

In conventional fuel cells, the MEA is interposed between two substantially fluid-impermeable, electrically conductive plates, commonly referred to as separator plates. The plates serve as current collectors, provide structural support for the electrode layers, typically provide means for directing the fuel and oxidant to the anode and cathode layers, respectively, and typically provide means for removing products, such as water, formed during operation of the fuel cell. When reactant channels are formed in the separator plates, the plates are sometimes referred to as fluid flow field plates.

Fuel cell stacks typically comprise an aligned assembly of fuel cells connected together mechanically and electrically in series to obtain desired voltage and power output. An early example of a fuel cell stack is illustrated in Maru U.S. Pat. No. 4,444,851 granted Apr. 24, 1984; a later example is illustrated in Washington U.S. Pat. No. 5,514,487 granted May 7, 1996. Typically, in any such stack, one side of a given fluid flow field plate (separator plate) is the anode plate for one cell, and the other side of the plate is the cathode plate for the adjacent cell, and so on seriatim. For this reason, the plates are sometimes referred to as bipolar plates.

Fluid reactant streams are typically supplied to the fuel cell electrodes via channels in the flow field plates communicating with external plenum chambers or manifolds connected to the sides of the stack, or communicating with internal plenum chambers or manifolds formed by aligning openings formed within the plates and MEAs in the stack. Internal manifolds have been almost universally used in preference to external manifolds for proton exchange membrane (PEM) fuel cell stacks; external manifolds are more commonly found in high-temperature fuel cell stacks such as phosphoric acid fuel cell stacks. Similarly, fluid stream exhaust conduits or manifolds may be external or internal. Typically the stack also has coolant passageways extending within it for circulating a coolant fluid to absorb heat generated by the exothermic fuel cell reaction.

The requisite flow-field channels in a fuel cell separator plate may be formed as a pattern of parallel open-faced fluid-flow channels formed in a major surface of a rigid, electrically conductive plate. The parallel channels extend between an inlet manifold opening and an outlet manifold opening formed in the plate. Watkins U.S. Pat. Nos. 4,988,583 and 5,108,849 issued Jan. 29, 1991 and Apr. 28, 1992, respectively, describe fluid-flow-field plates in which continuous open-faced fluid-flow channels formed in the surface of the plate traverse the central area of the plate surface in a plurality of passes, that is, in a serpentine manner, between an inlet manifold opening and an outlet manifold opening formed in the plate. Fluid-flow-field plates for electrochemical fuel cells in which the inlet and outlet flow channels are mutually disconnected, so that in operation the reactant stream must pass through the porous electrode layer to get from the inlet to the outlet, have also been described.

In a companion British application Ser. No. 9814123.7 (McLean et al., assigned to the applicant herein) filed on Jul. 1, 1998 there is disclosed in one embodiment of the invention of that application an undulate MEA layer sandwiched between successive planar separator plates for use in a PEM-type fuel cell stack. ("MEA" is an acronym for "membrane electrode assembly".) In conjunction with the separator plates, the undulations of the MEA layer serve to separate fuel flow channels from oxidant flow channels. Those flow channels bounded on one side by one separator plate of the sandwich are the fuel flow channels, and those channels bounded by the other of the two separator plates in the sandwich are the oxidant flow channels. In such undulate MEA layer/separator plate sandwiches, typically a given separator plate serves as the lower layer of a sandwich for one fuel cell and as the lower layer of a sandwich for one fuel cell immediately underneath it (assuming for the sake of this discussion, that the fuel cell stack is vertically oriented with the fuel cells forming generally horizontal strata in such stack—of course, the orientation is arbitrary). Consequently, for any given separator plate, fuel gas flows in a flow field on one side of the plate, and oxidant gas flows in a flow field on the other side of the plate. In each case, the flowpaths of the flow field are defined by the spaces formed by the undulations of the MEA layer. These flow channels extend in an axial sense from one side of the fuel cell stack to the opposite side.

In many conventional configurations, the flow channels form a serpentine flowpath. The term "serpentine" is understood to apply to a flowpath in which, in sequential flow channel components of the flowpath, a reversal of direction of gas flow occurs. Such flowpaths serve two principal objectives, viz to provide reactant gas efficiently to as much of the MEA layer surface as possible, and to provide flow channels that are long relative to their cross-sectional area.

If a serpentine flowpath design is chosen, it is often conveniently formed for the most part of straight channel segments that extend over most of one dimension of the working fuel cell surface and connect at their extremities to the next adjacent straight segment forming part of that particular flowpath. Representative such flowpath designs are illustrated, for example, in Washington U.S. Pat. No. 5,300,370 issued Apr. 5, 1994. Flowpath configurations other than serpentine may also conveniently include a number of relatively long straight channel segments requiring connection at their ends. Whatever the flowpath configuration, if it comprises through much of its length a series of parallel straight channel segments, then unless the channel segments are part of a continuous integral whole flowpath, some means at each end of each of the flow channels must be devised to interconnect selected channels so as to provide the requisite serpentine or other suitable flowpath configuration.

Further, it is not unusual in conventional fuel cells to provide in a reactant flow field a number of different flowpaths winding their way across the fuel cell surface in generally parallel alignment. The separation of such flowpaths normally need not be absolute; small imperfections and leaks do not normally deleteriously affect fuel cell performance; further, occasional concurrence of two or more flowpaths in a flow field may be advantageous for pressure and reactant concentration equalization, or for other purposes. It is, of course, necessary to avoid serious leaks that would permit a significant quantity of reactant gas to flow from an inlet point to an outlet point of a flow field by a short circuit (lower pressure drop path); it is necessary to preserve the basic integrity of the serpentine or other designed flowpath arrangement.

It will be understood that various means can be devised for interconnecting flow channels to provide the requisite serpentine or other selected flowpath from a selected inlet to a selected outlet in the flowfield. Various end coupling arrangements can be devised at the ends of the axially extending flow channels formed by the undulate MEA layer in conjunction with the separator plates between which it is sandwiched, in order to achieve this objective. However, some such coupling and interconnection arrangements can be relatively expensive to manufacture, and may require accurate alignment with the flow channels to be effective. For example, an end manifold for interconnecting flow channels in a fuel cell stack comprising, say, 100 fuel cells would have to provide end connections for thousands of channels—a formidable manufacturing and alignment task.

Alsthom-Atlantique U.K. patent specification GB 2 158 989 published Nov. 20, 1985 illustrates in FIGS. 10 and 11 thereof a display bipolar separator plates (referred to as bipolar current collectors), with a number of grooves or hollows in the planar faces of each plate that constitute flow channels for fuel and oxidant gas, respectively, and that run over the central portion of the plate in a direction parallel to the longitudinal axis of the plate. The network of channels can be formed by corrugation of the central portion of the plate. The gas is supplied to the plates from either an internal or external manifold to a series of channels that fan out from the manifold inlet to the central portion of the separator plate. Identical channels on the opposite end of the plate serve to remove exhaust gas. The flow channels in contact with the active region of the MEA are parallel to each other, and the ends of the channels opens into a common space in communication with the supply and exhaust channels, respectively. As a result, gas is supplied to a series of parallel flow channels by way of a common inlet and outlet opening. Thus, gas flows in a single direction across the surface of the plate.

Alsthom-Atlantique nowhere suggests that its flowpath configuration could be modified to provide a serpentine flowpath arrangement. Nor does Alsthom-Atlantique disclose a structure that includes or that could be readily modified to accommodate undulate configurations of the type disclosed in Applicant's British application Serial No. 9814123.7.

SUMMARY OF THE INVENTION

The present inventors have devised a very simple expedient for interconnecting, or coupling, flow channels together to form flowpaths of a flow field within a fuel cell sandwich (by "sandwich" is meant a repeating subassembly within a fuel cell stack). The sandwich preferably comprises an undulate MEA and adjacent separator plate together constituting a subcomponent of a PEM-type fuel cell stack of the type described above. Interconnection of the flow channels into a suitable flowpath, preferably a serpentine flowpath comprised of flow channels interconnected so that reactant gas flows in alternating directions in sequentially connected channels, is provided within such fuel cells by providing an array of interconnection couplings in a stratum (a stratum typically being either a separator plate or an MEA layer, or some combination of layers or portions of layers including a separator plate or an MEA layer). These couplings link together the flow channels into a pattern of suitably interconnected flow channels. The flow channels may conveniently be depressed cavities in the separator plates.

A similar arrangement of couplings may be used to couple together the parallel flowpaths of flowfields in a fuel cell stack in which undulate layers are present; in such case, while a suitable pattern of serpentine flowpaths remains a preferred objective, the inventors are not aware of any such interconnection arrangement that has previously been used to interconnect flow channels in association with undulate layers of any sort, whether or not serpentine flowpaths are formed. The couplings in such fuel cell stacks may conveniently be interconnection conduits or gaps formed by flattening or truncating small portions of the apices (or nadirs) of undulate MEA layers or undulate separator plates.

It is of course an objective that the structure providing the fuel gas set of couplings does not interfere with the structure providing the oxidant gas set of couplings, nor vice versa. Accordingly, at each longitudinal end of the fuel cell sandwich, the couplings for the oxidant gas flow channels are preferably transversely offset from those for the fuel gas flow channels.

The interconnecting couplings may be formed by stamping or moulding the stratum, for example. While the interconnection couplings may be formed in either the separator plate or MEA layer in a PEM-type fuel cell, by way of example and for simplification, much of the following discussion will refer to the formation of such couplings as cavities in the separator plate. It should be understood when reading the description that the designer could choose to form the couplings in the MEA layer instead. It should be further understood that while for simplicity the present invention is easiest presented on the assumption that at least one of the layers in the fuel cell sandwich is planar, either or both the MEA layer and separator layer may be non-planar.

The principles of flow channel interconnection as described herein using PEM-type fuel cells by way of example may be used in the design of other types of fuel cell.

Referring by way of example to flow channel couplings in separator plates, it is noted that in a thin separator plate, depressions on one major surface of the plate appear as embossments on the other, and vice versa. The depressions can be formed by stamping the separator plate, or by molding the separator plate to provide the requisite depressions. It is necessary that the depressions be hollowed out sufficiently to provide cavities of adequate size into and out of which reactant gas may flow for the purpose of interconnecting adjacent reactant gas flow channels. Suitable easily manufactured interconnection couplings providing a short flow conduit between adjacent flow channels are of the essence of the invention; the embossments are not of the essence, and in a thick enough plate, the depressions would not necessarily appear on the opposite sides of the plate as embossments. However, economy of materials and manufacture militate in favour of thin separator plates in which the depressions necessarily appear on the other side of the plates as embossments.

In this specification and the appended claims, the three mutually perpendicular directions and dimensions of interest are for convenience of description and definition named as follows:

(a) The stack dimension is the dimension extending from one extremity of the fuel cell stack to the other, perpendicular to the layers of the stack and perpendicular to the broad working surfaces of the MEA strata and to the broad surfaces of the separator plate herein described.

(b) The longitudinal dimension is the dimension parallel to the interconnected flow channels on the separator plate herein described.

(c) The transverse dimension is the dimension perpendicular to the other two dimensions.

Further, in the specification and the appended claims, undulate structures include structures that are generally undulate, but which may include interruptions in the undulations, such as, for example, planar sections that are in a plane perpendicular to the stack dimension.

Assuming that the designer chooses a serpentine flowpath (or an array of serpentine flowpaths) or some other suitable configuration in which parallel long straight channels are interconnected, the depressions and embossments are conveniently formed at or near the ends of the separator plate (in an axial sense), so that they may interconnect selected ones of the long straight flow channels formed in the undulate MEA/separator sandwich to form one or more serpentine flowpaths (say). On a given surface of the separator plate, it is apparent that only depressions will be effective to interconnect adjacent flow channels; embossments do not. The depressions must have a width in the transverse sense (i.e., perpendicular to the axial or flow sense) that is sufficient to enable adjacent flowpaths to be adequately interconnected, but the boundaries of the depressions should not come unduly close to the nearest MEA surfaces. Equally, the depth of the depressions must be sufficient to enable reactant gas to flow freely from one flow channel via the depression to the next adjacent flow channel. Accordingly, the width of a depression cannot be appreciably wider than about half the distance between adjacent apices of the undulate MEA layer, because otherwise, the depression would tend to interfere with the access of reactant gas on the other side of the separator plate to the next consecutive MEA layer in the stack. So the shape and size of the depression must be designed both with its interconnectivity objective in mind, and also with the objecting of avoiding interference with the flow of reactant gas to the MEA layer on the other side of the separator plate in mind (with the understanding that a depression on one surface of the separator plate may appear on the opposite surface as an embossment that will partially penetrate into the flow channel on the other side of the separator plate).

Note that depending upon the flow field design, more than two channels in a group of sequential flow channels adjacent a stratum may be coupled together at one longitudinal end thereof; in such cases, it is necessary to consider the implications of such interconnection not only for the flow field directly affected but also for the flow field on the other side of the stratum, since in the absence of proper design, there may be competing demands from the flow fields on either side of the stratum for overlapping interconnection space. If the couplings for the oxidant gas flow channels are longitudinally offset from those for the fuel gas flow channels by at least a distance equal to the longitudinal extension of a coupling (requiring that the couplings for one or the other set be slightly inset from a respective longitudinal end of a stratum), this potential problem is avoided.

In the context of separator plate coupling cavity design, it will be apparent from the foregoing that as embossments on one side of the plate constitute depressions on the other side of the plate and vice versa, if one looks merely at one side of such a separator plate, one will see depressions for interconnecting flow channels for one of the reactant gases formed on that side of the separator plate. But with a thin enough plate, one will also see embossments for the other of the reactant gases (these embossments defining depressions on the other side of the separator plate for interconnecting flow channels for the other reactant gas that flows on the other side of the separator plate).

The length in the axial sense of any given depression will be expected to be at least roughly equal to the distance between adjoining apices of the of the MEA layer in order that the pressure drop, as the reactant gas flows form one flow channel through the depression to the adjacent flow channel, will not be unduly large. The dimensions overall of the depression, and the shaping of the depression, can be selected empirically to give the requisite pressure drop, and to provide the desirable turbulence within the flowpath arrangement.

The invention enables ready creation and economical manufacture of suitable structure for providing flow fields without the need for any external manifolding other than for flowpath end connections. No external flowpath control elements are required for the implementation of the invention. Economy of manufacture of internal configuration can be met, while also meeting the usual objectives of space efficiency and usual flowpath desiderata such as supply of reactant gas to a relatively high proportion of the accessible active surface area of the adjacent MEA layer, and long length of flowpath relative to cross-section. (The use of small external plena may, however, facilitate supply and exhaust of reactant gases to and from the flow fields.) Note in particular that once the stack space required for the flow channels is established, the channel interconnection arrangement of the invention can be accomplished without requiring any addition space, and equally, no extra components (except possibly flow channel end stoppers, and even these can be omitted if suitable end crimping or sealing is used) need be added to contribute to stack weight, thereby contributing to both the volumetric and weight power density efficiency of the stack. The invention also facilitates the ready design of uniform multiple flowpaths in a given reactant gas flow field.

It is also an aspect of the invention to use hydrogen in a fuel cell stack made up of fuel cells having separator plates as heretofore described and connectable via an anode terminal and a cathode terminal to an external load. Each fuel cell has an MEA layer and two discrete associated reactant-gas impermeable separator layers. The MEA layer has a porous anode electrode, a porous cathode electrode, an electrolytic membrane layer disposed between the two electrodes, an anode electro-catalyst layer disposed between the electrolytic membrane layer and the anode electrode, and a cathode electro-catalyst layer disposed between the electrolytic membrane layer and the cathode electrode. One side of one separator layer in conjunction with the MEA layer provides at least one flowpath of a flow field for hydrogen and one side of the other separator layer in conjunction with the MEA layer provides at least one flowpath of a flow field for a selected oxidant. The flowpaths are constituted over their greater length by parallel transversely spaced and longitudinally extending flow channels interconnected in the vicinity of their ends to form the flowpaths. The MEA layer is installed in the stack between the associated separator layers so that the side of the separator layer that in conjunction with the MEA layer provides flow channels of a flow field for hydrogen faces and is in contact with the anode side of the MEA layer, whilst the side of the separator layer providing flow channels of a flow field for oxidant faces and is in contact with the cathode side of the MEA layer, so that the hydrogen flow channels are closed to form a conduit for supplying hydrogen to the MEA layer and the oxidant flow channels are closed to form a conduit for supplying oxidant to the MEA layer. The fuel cells are stacked in sequence, the anode electrode of the fuel cell at one extremity of the stack being electrically connected to the anode terminal, the cathode electrode of the fuel cell at the other extremity of the stack being electrically connected to the cathode terminal, and the anode electrode of each of the other fuel cells in the stack being electrically connected to the cathode electrode of the next adjacent fuel cell. When the anode terminal and cathode terminal are electrically connected through an external load and for each fuel cell hydrogen is supplied to the hydrogen conduit and oxygen is supplied to the oxidant conduit, then in each fuel cell hydrogen moves from the hydrogen flow field through the anode electrode and is ionized at the anode electro-catalyst layer to yield electrons and hydrogen ions, the hydrogen ions migrate through the electrolytic membrane layer to react with oxygen that has moved from the oxidant flow field through the cathode to the cathode electro-catalyst layer and with electrons that have moved from the anode electrode electrically connected to the cathode electrode, thereby to form water as a reaction product, and a useful current of electrons is thereby produced through the load.

SUMMARY OF THE DRAWINGS

FIG. 8 is a schematic section elevation view taken through an end portion (in the axial sense) of a simplified PEM-type fuel cell stack (not illustrated elsewhere), showing fuel flow path interconnections formed by selected flattened portions of apices of undulate MEA layers in the stack, constructed in accordance with the principles of the present invention.

DETAILED DESCRIPTION

A detailed description of a PEM-type fuel cell stack incorporating a stacked array of generally parallel fuel cell elements, each having an undulate MEA layer sandwiched between consecutive plates in the stack, is described in the Applicant's British application Serial No. 9814123.7. The undulations establish with the separator layers the boundaries of axially extending flow channels through which the reactant gases flow. In the arrangement described in that British application, the separator plates are designed to contact the apices of the undulate MEA layer over the effective axial length of the MEA layer, so as to avoid interconnection of adjacent flow channels for a given reactant gas. (It does not matter very much if there are small leaks between adjacent flow channels, as long as the overall integrity of the flow path arrangement is maintained; however, it is not an objective of the structure described in that British application to interconnect adjacent flow channels, except through a suitable end coupling arrangement that selectively couples the flow channels into the requisite flowpath arrangement for the fuel cell).

By contrast, according to the present invention, either the separator plates or the undulate MEA layers are deliberately formed to provide selected regions of interconnection between adjacent flow channels in an undulate MEA layer/separator plate sandwich of the type described. These deliberately designed regions of interconnection are formed in the vicinity of the axial ends of the flow channels, so as to enable the combination of flow channels to provide the requisite serpentine flow path (say), or flow paths, for a given fuel cell. It is contemplated that these flow path arrangements will be identical from cell to cell in the fuel cell stack.

Figure 1:
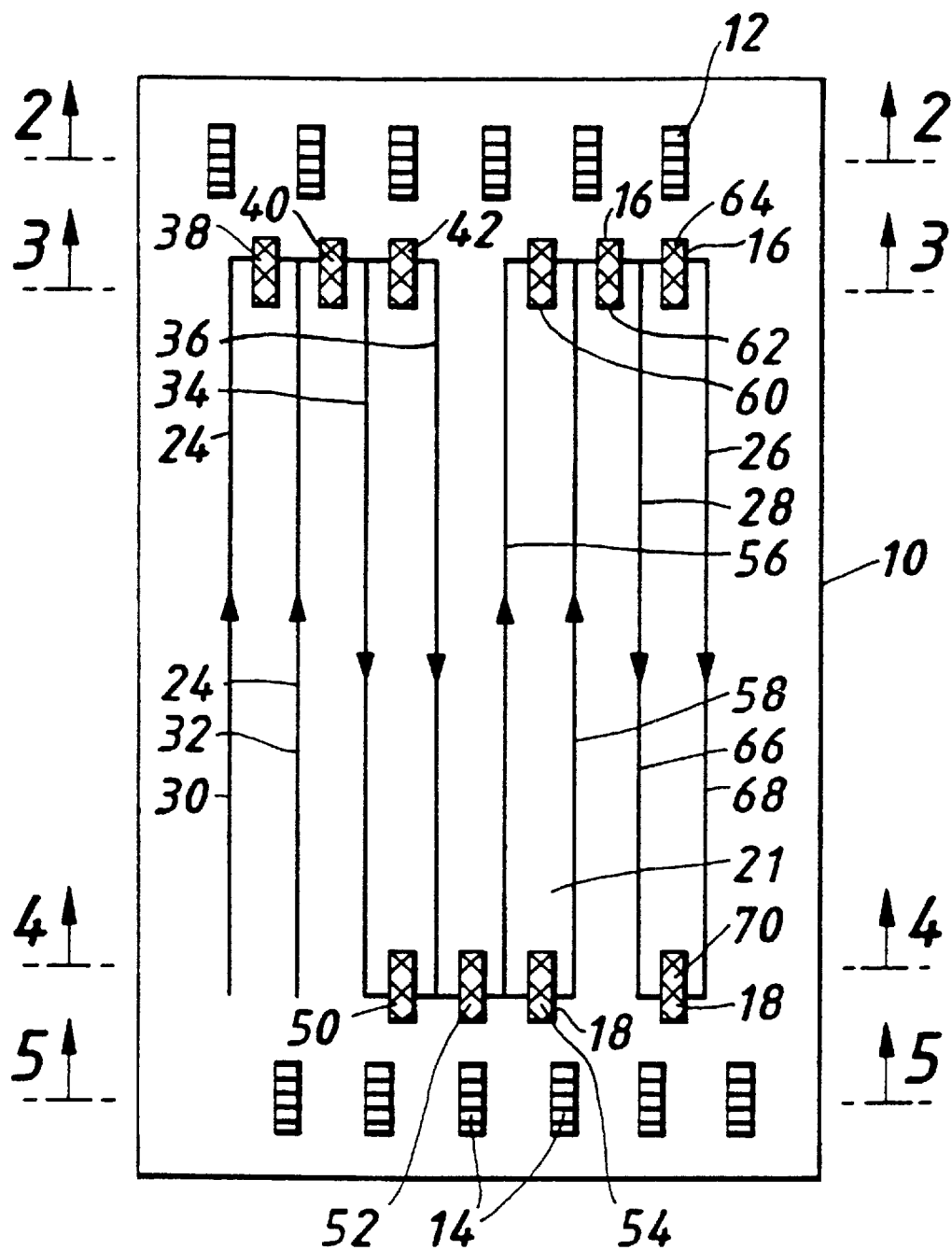
FIG. 1 is a schematic plan view of a simplified separator plate for use in a PEM-type fuel cell stack, constructed in accordance with the principles of the present invention and provided with an array of embossments and depressions in the vicinity of the axial ends of the plate, and schematically illustrating a reactant flowpath formed thereon by such separator plate in conjunction with a mating undulate MEA layer.
Figure 2:
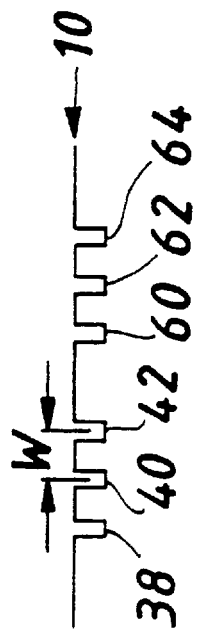
FIG. 2 is a schematic section view taken along line 2—2 of FIG. 1.
Figure 3:
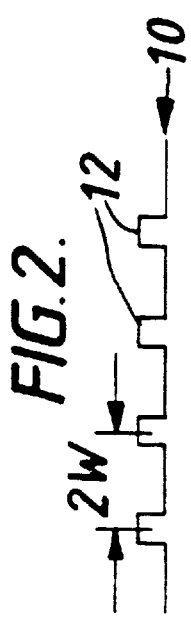
FIG. 3 is a schematic section view taken along line 3—3 of FIG. 1.
Figure 4:
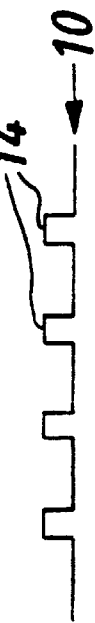
FIG. 4 is a schematic section view taken along line 4—4 in FIG. 1.
Figure 5:
FIG. 5 is a schematic section view taken along line 5—5 in FIG. 1.

Accordingly, referring to FIG. 1, a separator plate 10 is shown for use in a PEM-type fuel cell stack in conjunction with an associated sandwiched undulate MEA layer 20 (for convenience of illustration, shown detached in FIG. 6; not shown in FIG. 1) located adjacent each surface of separator plate 10. The undulations of MEA layer 20 define reactant gas flowpaths, the fuel flowpath(s) being on one side of the separator plate 10 and the oxidant flowpath(s) being on the other side. For purposes of exemplary illustration, the oxidant gas flowpaths are schematically shown in FIG. 1 as comprising flow channel lines generally indicated as 24 that are interconnected at their ends by depressions 16, 18 to provide a complete flow field 21, as will hereinafter be described.

The separator plate 10 is provided with an array of embossments 12 in the vicinity of one end of the separator plate 10 and another array of embossments 14 at the other end of the separator plate 10. These embossments 12, 14 are formed to be hollow within, so that they appear as depressions on the reverse surface of separator plate 10, the obverse surface being that illustrated in FIG. 1.

Also appearing toward one end of separator plate 10 is the array of depressions 16 that in turn form embossments on the reverse surface of separator plate 10. In the vicinity of the other end of the separator plate 10 is the array of depressions 18 that again form embossments on the reverse surface of separator plate 10. Embossments/depressions 12, 14, 16, 18 are conveniently manufactured by molding or stamping the separator plate 10.

Since embossments 12 and 14, appearing in FIG. 1, are the obverse of counterpart depressions that appear on the reverse of the separator plate 10, it will be apparent from the previous discussion that these embossments 12, 14 are intended to serve as depressions that interconnect flow channels (not shown in FIG. 1) on the reverse of separator plate 10 to complete one or more flowpaths on the reverse of the separator plate 10. It is the depressions 16 and 18 on the obverse of separator plate 10 that complete the flowpath(s) on the obverse side of separator plate 10, and for convenience, these will be further discussed. However, the discussion applicable to depressions 16 and 18, with appropriate modifications where needed, can apply in principle to the interconnection of flow channels and the consequent completion of flowpaths on the reverse of separator plate 10.

As mentioned, for the purpose of exemplary illustration it is the oxidant flowpaths that are shown on the obverse of separator plate 10; the fuel flowpath arrangement, therefore, is on the reverse of separator plate 10.

Figure 6:
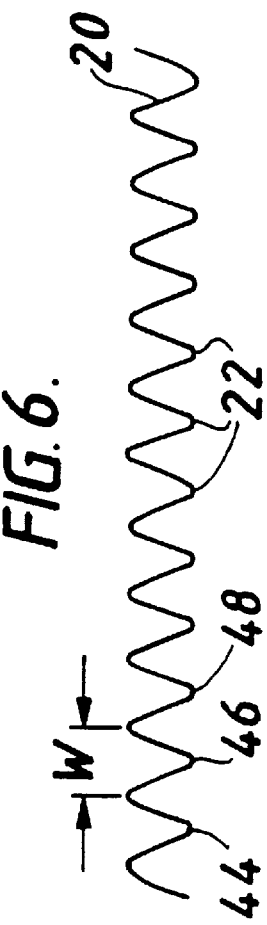
FIG. 6 is a schematic section elevation view of an MEA layer mating with the separator plate of FIG. 1 and with the separator plate of FIG. 1 forming the reactant flow channels for the fuel cell.

The flow channels 24, as previously discussed, are formed by the contacting of the separator plate 10 by apices 22 of the adjacent MEA layer 20, shown in schematic cross-section view in FIG. 6. Accordingly, the width of any given flow channel 24 along the boundary surface of such flow channel 24 constituted by separator plate 10, will be necessarily the width W between adjacent apices 22 of MEA layer 20. (In this specification and the appended claims, the wall thickness of the flow channel walls is ignored when equating flow channel width to the foregoing width W.) For schematic purposes, however, these flow channels are represented in FIG. 1 simply as flow channel lines 24. For the sake of providing a convenient working example, let us assume that the flow field generally indicated as 21 on the obverse of separator plate 10 requires that there be two complete parallel flowpaths 26, 28, pursuant to the designer's preference. What is accordingly required is that the depressions 16 and 18 complete the flow channel connections for flowpaths 26 and 28 so that the flowfield pattern on the obverse of separator plate 10 will be complete. Note in this regard that it is not essential that the flowpaths 26, 28 be isolated from one another; what is important is the overall length of the flowpaths desired, given the overall flowpath objective of serving as much as possible of the surface area of the MEA layer adjacent, the given width W of the flow channels (FIG. 6), and a designed pressure drop; these parameters must be consistent with the number of designed flowpaths in the flow field 21.

Assuming that oxidant gas is supplied by a plenum (not shown) to flow channels 30, 32 at the inlet end of the flowfield 21 on the obverse of separator plate 10, and that the flowpaths 26, 28 are intended to be essentially serpentine, it follows that the next two adjacent flow channels 34, 36 will require the oxidant gas to flow in the direction opposite to that of the flow in channels 30, 32. Accordingly, depressed cavities (depressions) 38, 40 and 42 formed in separator plate 10 are positioned to give effect to the intended interconnection of channels 30, 32 with channels 34, 36. To this end, depressed cavities 38, 40 and 42 are positioned to lie exactly underneath corresponding apices 44, 46 and 48 of MEA layer 20. Because the channels 38, 40 and 42 exactly underlie the counterpart apices 44, 46 and 48 of the MEA layer 20, it follows that oxidant gas via interconnecting cavities 38, 40 and 42 can flow freely underneath the apices 44, 46, 48 of MEA layer 20 into adjacent flow channels. Therefore, oxidant gas may flow from flow channel 30 via depressed cavity 38 into the end portion of adjacent flow channel 32 thence via depressed cavity 40 into the next adjacent flow channel 34 and via depressed cavity 42 into the next adjacent flow channel 36. Similarly, oxidant gas at the outlet end of flow channel 32 may pass via depressed cavities 40, 42 to flow channels 34 and 36. There is no tendency of gas to flow from the downstream end of flow channel 32 to the downstream end of flow channel 30 because of the applicable pressure differentials at the downstream ends of flow channels 30 and 32 and the upstream ends of flow channels 34 and 36.

A coupling of flow channels for redirection of gas flow next occurs at the downstream end of channels 34 and 36, where depressed cavities 50, 52 and 54 couple channels 34, 36 to the upstream ends of channels 56, 58. At the downstream ends of flow channels 56 and 58, depressed cavities 60, 62, 64 couple flow channels 56 and 58 to the final pair of flow channels 66, 68 appearing in the simplified diagram of FIG. 1. The downstream ends of flow channels 66, 68 would be connected to an exhaust plenum or the like (not shown) for spent oxidant gas via exhaust channel interconnection cavity 70.

The foregoing discussion, of course, assumes that all of the flow channels are stopped at their respective axially remote ends just outside the regions of interconnection provided by the depressions 16, 18. The stopping can be effected by any convenient sealing compound, plug or the like. Usual fuel cell design principles apply; precautions must be taken to prevent leaks and particularly to prevent intermingling of fuel and oxidant gases outside of the fuel cells.

No specific oxidant gas inlet, nor oxidant gas outlet, has been illustrated in FIG. 1, inlet and outlet couplings for connection to supply and exhaust plena respectively being in the designer's discretion. However, the designer may wish, for coupling convenience, to provide additional depressed cavities (not shown), such as cavity 70 for the exhaust connection, at the inlet ends of the flow paths 26, 28 for convenience of coupling to an oxidant supply plenum; such terminating cavities as cavity 70 may also facilitate an equalization of pressure in the flow channels 26, 28 (or as the case may be).

The separator plates 10 are gas-impermeable and, for both fuel cell service and convenience of manufacture, are preferably made of stampable or moldable or machinable material of suitable ductility and stiffness. Suitable materials of which plates 10 may be manufactured include stampable graphite foil, molded graphite sheet, relatively inert metal foils or thin sheets, and coated metal foils or thin sheets. Note that in order to avoid contamination of the reactant gases, if the separator plates 10 are made of metal, then either the metal must not pass into the reactant gases, or if it does, must not interfere with the electrochemical activity of the fuel cell. Any potentially contaminating metal used should, following the stamping procedure, be provided with an overlying coating of relatively inert material, such an adherent graphite compound, or the like.

An alternative to manufacturing the separator plates from conductive materials is to manufacture them from substantially non-conductive materials such as molded plastics or composites and to provide a conductive path through the non-conductive separator plate.

The schematic section views of FIGS. 2 through 5, like the plan view of FIG. 1, should not be taken as indicating accurate dimensional relationships, but only to indicate relative positions of the embossments 12 and depressions 16 respectively on separator plate 10. Looking, for example, at FIG. 3, adjacent ones of depressed cavities 38, 40 and 42 are spaced apart from one another exactly by the width W of a flow channel 24 (see also FIG. 6) as measured between adjacent contacting apices 22 of MEA layer 20, as previously discussed. There is a space of width 2W, or two flow-channel widths, between depressed cavities 42 and 60, because it is not desired at that end of the separator plate 10 to interconnect flow channels 36 and 56; the exemplary serpentine flow path arrangement requires that such interconnection occur at the opposite end of separator plate 10, as revealed in FIG. 4. Similarly, FIG. 4 reveals separations between adjacent ones of depressed cavities 50, 52 and 54, by flow-channel width W, but the distance between depressions 54 and 70 is 2W, indicating that no interconnection at that end of separator plate 10 is wanted of adjacent flow channels 58 and 66.

Typically there is a difference in flow path length between the fuel gas flow field (longer) and the oxidant gas flow field (shorter)—this implies that fuel gas interconnection depressions 12, 14 will typically be more numerous than the oxidant gas interconnection depressions and typically spaced from one another by a distance 2W, where W is the flowpath width. In the exemplary simplified schematic diagrams provided, the fuel gas flow field is assumed to comprise a single serpentine flowpath whereas the oxidant gas flow field comprises two parallel serpentine flowpaths, as previously discussed. The reason for the difference is that the fuel cell reaction product (water) tends to be exhausted primarily in the effluent fuel gas stream, and it is helpful to have a relatively large pressure drop from inlet to outlet of the fuel gas path to facilitate the removal of the water. To enhance the pressure drop in the fuel cell path, the channel interconnection depressions 12, 14 for the fuel gas may be shallower than the interconnection depressions for the oxidant gas, and means (not shown) such as flow channel wall irregularities may be provided to provide turbulence and to increase the pressure drop.

Note that the invention enables the ready design of uniformity of multiple-path flow fields. If multiple flowpaths exist in a given reactant gas flow field (as in the case of the two exemplary oxidant gas flowpaths 26, 28 of the exemplary separator plate 10), by using the teachings of the present invention to locate the two sets of interconnecting depressions (16 and 18 in the exemplary structure of FIG. 1) equidistantly from the respective neighbouring ends of the separator plate 10, with spacings between depressions suitable to the specific flowpath arrangement designed, then the path length for each flowpath 26, 28 is uniform, and the number of interconnecting depressions is the same for each flowpath 26, 28. This implies generally that by using the principles of the invention, the pressure drop over all flowpaths in any given flow field is (desirably) uniform from flowpath to flowpath; there is no preferred flowpath from inlet to outlet of the flow field. This in turn promotes efficient supply of reactant gas to all accessible portions of the active surface of the adjacent MEA layer.

The actual widths and depths of the depressions 16, 18 and of the cavities that are formed on the reverse of plate 10 by embossments 12 and 14, are within the designer's discretion, and will depend upon the waveform shape of the undulate MEA layer 20, the dimensions of the flow channels 26, 28, the composition and supply pressure of the reactant gas, the flow rate expected to occur through the flow paths 24, and possibly other parameters. The object, of course, is to ensure that the cavities 16, 18 are sufficiently wide and deep to provide a relatively smooth flow of gas therethrough from one flow channel to the next adjacent flow channel, while creating such pressure drop and turbulence as the designer intends.

Figure 7:
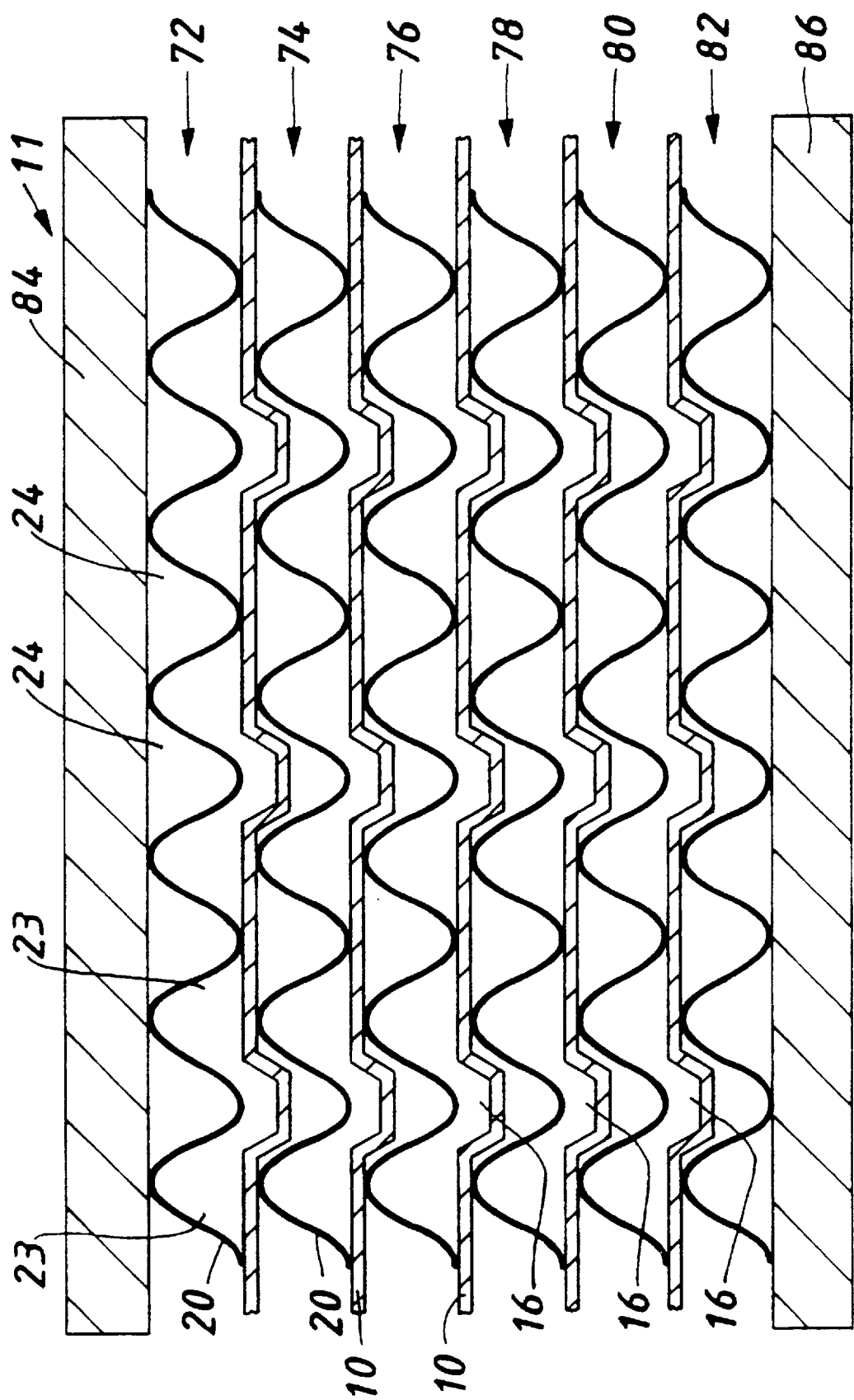
FIG. 7 is a schematic section elevation view taken through an end portion (in the axial sense) of a simplified PEM-type fuel cell stack (not illustrated elsewhere), showing fuel flow path interconnections formed by depressions in separator plates in the stack, constructed in accordance with the principles of the present invention.

FIG. 7 illustrates the point that the depressions 16, 18 should not be too deep nor too wide, because there is otherwise the risk of interference of the bottom of the depression (as viewed in FIG. 7, the orientation of course being arbitrary) with the next adjacent stratum in the fuel cell stack, to which stratum the depression appears as an inverted embossment. In FIG. 7, an exemplary six fuel cell strata 72, 74, 76, 78, 80 and 82 are shown sandwiched between terminal plates 84, 86 of the schematic fuel cell stack illustrated (of course, in an actual high-power fuel cell stack, one would expect a very large number of strata—typically more than 100). In FIG. 7, only the interconnection cavities between fuel flow paths are illustrated; those interconnections for the oxidant flow paths are for convenience and simplicity omitted.

Each stratum 72, etc. includes an undulate MEA layer 20 that forms, with adjacent separator plates 10 (and in the case of the uppermost and lowermost strata 72, 82, with the terminal plates 84 and 86) fuel flow channels 23 and oxidant flow channels 24.

For simplicity, let us assume that the fuel flow field comprises a single serpentine flowpath from the inlet end of the flowpath to the outlet. In that case, depressed channel interconnection cavities 12 (say) will be provided at the end of the schematic fuel cell through which FIG. 7 is a schematic section view, only for alternate boundary walls (coinciding with apices of the undulate MEA layers) of fuel flow channels 23. So, for example, looking at the uppermost stratum 72 of fuel cell stack 11, the two leftmost fuel flow channels 23 are interconnected via a depressed cavity 12, but the second and third fuel flow channels from the left are not interconnected, the third and fourth are interconnected, the fourth and fifth are not, and so forth. It will be readily understood that this scheme of interconnection generates a single overall serpentine fuel flowpath 23, and as the pattern is repeated identically for each stratum 74, 76 etc., the same flowpath arrangement will subsist in these other strata as well. It is, of course, convenient to have the flow fields identical from one stratum to the next, for convenience in providing coupling to supply and exhaust plena, etc., as well as for economy of manufacture.

It can also be seen from FIG. 7 that wherever there is a depressed interconnection cavity 16 in a relatively thin separator plate 10, there is encroachment into the oxidant flow channel immediately underneath such depression 16 (as viewed in FIG. 7; the orientation is arbitrary). It will be recalled that any depression 16 serving the fuel flowpath 23 appears in thin plates as an inverted embossment 12 in the oxidant flowpath on the other side of such thin separator plate 10 under study. For effective operation of the fuel cells, it is necessary that the reactant gases readily reach all of the exposed surface of the MEA layer 20 constituting one boundary of each flow channel. Accordingly, the depressions 16 should preferably be shaped and dimensioned to avoid coming too close to the underlying undulate MEA layer 20, thereby avoiding interference with the optimum operation of the underlying fuel cell.

FIG. 8 illustrates an alternative to the structure of FIG. 7 illustrating the important point that the undulate MEA layers 20, rather than the separator plates 10, may be configured to provide the interconnections between flowpaths. In the FIG. 8 embodiment, the separator plates 10 are planar and are not provided with any interconnection cavities. Instead, interconnection is provided by truncating selected portions of the undulations of undulate MEA layers 20. The truncation leads to the formation of flattened portions 88; in FIG. 8, these truncated portions have been designed to occur once in every two cycles of the undulate wave-form pattern of the undulate MEA layers 20 through which the section view of FIG. 8 is taken. The result is that adjacent pairs of fuel flowpaths 23 are interconnected by reason of the gaps 16 that are formed between the flattened truncated portions 88 of the MEA layers 20 and the respective neighbouring separator plates 10. Of course, these flattened portions 88 would be limited in longitudinal extent (in the longitudinal dimension as defined above) and would be located near one longitudinal end of the fuel cell stack. A companion set of such truncated portions 88 would accordingly be located at the other longitudinal end of the fuel cell stack, but would be offset from the truncated portions 88 illustrated in FIG. 8, thereby to provide interconnection for offset pairs of fuel gas flowpaths 23 at such other end of the fuel cell stack. The geometric principle is precisely the same as illustrated in FIG. 1, for example.

Various methods for fabrication of undulate MEA layers 20 shown in FIGS. 7 and 8 are described in detail in the Applicant's British application Serial No. 9814123.7. In general, undulate MEA layers may be made by either pressing catalyzed membrane material between pre-formed, relatively stiff current collector screens or by forming a semi-solid membrane in-situ between a pair of pre-formed current collector screens. Although variants are possible, the undulate MEA layers 20 are most conveniently formed into the desired undulate shape from essentially flat sheet materials or are molded into the desired shape from bulk material feedstock.

When sheet materials are used as the feedstock the undulate shapes of the MEA layers 20 are formed by stamping, rolling pressing or otherwise mechanically working the sheets to impress them with the desired form. When these methods are used the tools that create the undulate structure can be designed to include the cavities and indentations at the appropriate locations to achieve the required flattened truncated portions 88 in the formed current collector screens. For example, in one form of manufacture continuous sheet screen material is fed through a pair of gear-toothed counter-rotating rollers to produce a crimped sheet that takes on an undulate shape according to the pattern formed by the meshing of the geared rollers. The geared rollers are modified by removing parts of the geared teeth near the ends of the rollers and filling in the appropriate space on the mating roller. As a result, the formed undulate screen will contain the desired flattened truncated portions 88 that will facilitate the interconnection of reactant flowpaths according to the present invention. The rollers must be sized properly so that at least one set of the repeating flow control structure pattern is formed into the sheet per revolution. This example is intended only to demonstrate the ease with which the desired shapes can be formed; specific means for the manufacture of the screens are beyond the scope of this invention.

When bulk materials and molding is used it is a straightforward task of mold design to create the required cavities and indentations at the appropriate locations in the mold to produce the required flattened truncated portions 88 in the MEA layers 20.

Whether the designer chooses to provide gaps or cavities in the separator layer, or in the MEA layer, or in some suitable combination of both, is up to the designer. Given that the undulate MEA layer is non-planar in the examples illustrated, it may be a fairly easy task to add to the preformed MEA layer configuration the requisite truncated portions 88 illustrated in FIG. 8. That design approach would permit the separator plates 10 to be conveniently manufactured simply as planar plates. On the other hand, there is always some flexibility in the MEA layers 20, leading to the possibility of migration of the material of which they are formed, and that possibility of material migration could tend to close the gaps 16 illustrated in FIG. 8, especially under the compressive forces exerted within a typical fuel cell stack. However, reinforcing means (not shown) could be provided adjacent the truncated portions 88 between those truncated portions 88 and respective neighbouring MEA layers 20 to prevent the gaps 16 from closing, if material migration of the MEA layers 20 is perceived as a potential problem. Other design solutions intended to meet specific fuel cell problems or fuel cell stack problems will readily occur to the designer within the framework of the invention as described herein.

It should also be understood that the interconnection cavities could be formed in the MEA of a planar MEA fuel cell having undulate separator plates in the same manner as is described above in reference to FIG. 7. Similarly, interconnections could be formed in undulate separator plates in the same manner as is described above in reference to FIG. 8.

Hydrogen may be used as a fuel gas in exemplary fuel cell stacks 11 illustrated in FIGS. 7 and 8. Each fuel cell stack 11 is made up of fuel cells 72, 74, 76, 78, 80 and 82 having separator plates 10 as heretofore described and is connectable via a cathode terminal (not shown) and an anode terminal (not shown) to an external load (not shown). Each fuel cell 72, 74, 76, 78, 80 and 82 has a discrete MEA layer 20 and is associated with two reactant-gas impermeable separator layers 10. Each MEA layer 20 has a porous anode electrode, a porous cathode electrode, an electrolytic membrane layer disposed between the two electrodes, an anode electro-catalyst layer disposed between the electrolytic membrane layer and the anode electrode, and a cathode electro-catalyst layer disposed between the electrolytic membrane layer and the cathode electrode. For each fuel cell 72, 74, 76, 78, 80 and 82, one side of one associated separator layer 10 in conjunction with the MEA layer 20 provides at least one flowpath of a flow field for hydrogen and one side of the other associated separator layer in conjunction with the MEA layer provides at least one flowpath of a flow field for a selected oxidant. The flowpaths are constituted over their greater length by parallel transversely spaced and longitudinally extending flow channels interconnected in the vicinity of their ends to form the flowpaths. Each MEA layer 20 is installed in the stack between the associated separator layers 10 so that the side of the separator layer that in conjunction with the MEA layer provides flow channels of a flow field for hydrogen faces and is in contact with the anode side of the MEA layer 20, whilst the side of the separator layer providing flow channels of a flow field for oxidant faces and is in contact with the cathode side of the MEA layer 20, so that the hydrogen flow channels are closed to form a conduit for supplying hydrogen to the MEA layer 20 and the oxidant flow channels are interconnected in the manner described above to form a conduit for supplying oxidant to the MEA layer 20. For example, in the fuel cell having reference numeral 72, the oxidant flow channels are indicated by reference numeral 24 and the hydrogen flow channels by reference numeral 23. The fuel cells 72, 74, 76, 78, 80 and 82 are stacked in sequence and the anode electrode 86 of the fuel cell at one extremity of the stack electrically connected to the anode terminal, the cathode electrode 84 of the fuel cell 72 at the other extremity of the stack 10 electrically connected to the cathode terminal, and the anode electrode of each of the other fuel cells in the stack electrically connected to the cathode electrode of the next adjacent fuel cell. When the anode terminal and cathode terminal are electrically connected through an external load and for each fuel cell hydrogen is supplied to the hydrogen conduit and oxygen is supplied to the oxidant conduit, then in each fuel cell hydrogen moves from the hydrogen flow field through the anode electrode and is ionized at the anode electro-catalyst layer to yield electrons and hydrogen ions, the hydrogen ions migrate through the electrolytic membrane layer to react with oxygen that has moved from the oxidant flow field through the cathode to the cathode electro-catalyst layer and with electrons that have moved from the anode electrode electrically connected to the cathode electrode, thereby to form water as a reaction product, and a useful current of electrons is thereby produced through the load.

Further equivalents, variants, modifications, and improvements of the embodiments of the invention described herein will readily occur to those skilled in the technology. The scope of the invention is as defined in the appended claims.

What is claimed is:

1. A proton exchange membrane fuel cell stack comprising a membrane electrode assembly layer having a first surface and a second surface wherein a fuel gas flow field comprising at least one fuel gas flowpath is adjacent the first surface and an oxidant gas flow field comprising at least one oxidant gas flowpath is adjacent the second surface, the flowpaths having parallel transversely spaced and longitudinally extending flow channels interconnected in the vicinity of the ends of the flow channels to form the flowpaths, the improvement comprising:

said membrane electrode assembly layer being provided, on both the first and second surfaces, with an array of spaced flow channel couplings, each coupling interconnecting at least two adjacent flow channels on the same surface of the assembly to form flowpaths for each of a fuel gas and an oxidant gas on respective surfaces of the assembly, wherein the couplings for the oxidant gas flow channels are transversely offset from the couplings for the fuel gas flow channels and wherein the membrane electrode assembly layer is undulate.

2. The membrane electrode assembly of claim 1, wherein each said flowpath comprises first flow channels for gas flow in one direction and second flow channels for gas flow in the opposite direction wherein the couplings interconnect at least one of the first flow channels with at least one of the second flow channels adjacent a common assembly surface to form serpentine flowpaths for each of the fuel and oxidant gases.

3. The membrane electrode assembly layer of any one of claims 1 and 2 wherein the couplings are formed by truncated portions of the undulations of the MEA layer.

4. The membrane electrode assembly layer of claim 3 wherein the truncated portions of the undulations of the MEA layer occur once in every two cycles of the undulate wave-form pattern of the undulate MEA layer.

5. The membrane electrode assembly layer of claim 1, wherein, for a flow field comprising a single flowpath, the longitudinal center lines of the couplings are each spaced from the longitudinal center lines of nearest neighboring couplings by twice the distance between the center lines of adjacent flowpaths, and wherein the couplings for such flow field at one longitudinal end of the MEA layer are offset transversely from the couplings for such flow field at the other longitudinal end of the MEA layer by the distance between the center lines of adjacent flowpaths.

6. The membrane electrode assembly layer of claim 1 wherein, for a flow field comprising at least two flowpaths, the couplings being arranged in clusters, each cluster comprising one more said coupling than the number of flowpaths, and each cluster being separated from the nearest neighboring cluster, measured as between the longitudinal center lines of the nearest neighboring said coupling in each cluster, by the number of flowpaths times the distance between the center lines of adjacent flowpaths.

7. The membrane electrode assembly layer of claim 1, wherein the flow field for the fuel gas comprises a single flowpath and wherein the flow field for the oxidant gas comprises at least two flowpaths.

8. The membrane electrode assembly layer of claim 1, wherein the fuel gas flow channels are of the same length, the oxidant gas flow channels are of the same length, the couplings for the fuel gas flow channels at each longitudinal end of the MEA layer are transversely aligned, and the couplings for the oxidant gas flow channels at each longitudinal end of the MEA layer are transversely aligned.

9. The membrane electrode assembly layer of claim 1, wherein the couplings for the oxidant gas flow channels are inset longitudinally from the couplings for the fuel gas flow channels.

10. A PEM fuel cell stack comprising a series of undulate MEA layers between which are interposed separator plates, one surface of each MEA layer lying adjacent a fuel gas flow having at least one fuel gas flowpath and the other surface of each MEA layer lying adjacent an oxidant gas flow field having at least one oxidant gas flowpath, wherein the flowpaths are constituted over their greater length by parallel transversely spaced and longitudinally extending flow channels interconnected in the vicinity of their ends to form the flowpaths; characterized in that each MEA layer is provided on each surface thereof in the vicinity of each longitudinal end thereof with an array of spaced flow channel couplings for interconnecting selected ones of said flow channels adjacent each respective MEA surface, thereby to form adjacent the respective surfaces of the MEA layer the requisite reactant gas flow fields, and wherein the couplings for the oxidant gas flow channels are transversely offset from the couplings for the fuel gas flow channels, and wherein the apices of the undulate MEA layers are in contact with adjacent said separator plates, thereby defining with the adjacent separator plates the reactant gas flow channels for the fuel cell stack.

11. A proton exchange membrane fuel cell stack comprising a plurality of fuel cells, at least one fuel cell comprising the membrane electrode assembly layer of claim 8 wherein each of said flowpaths comprises selected first flow channels for gas flow in one direction and selected second flow channels for gas flow in the opposite direction, and wherein said couplings interconnect selected ones of said first flow channels with selected ones of said second flow channels adjacent a common said surface thereby to form serpentine flowpaths for each of the fuel and oxidant gases.

* * * * *